March 29, 1927. 1,622,381
C. HOLM ET AL
LABELING MACHINE
Filed March 13, 1923 7 Sheets-Sheet 1

Witnesses
Harold W. Eaton
Leah A. Serious

Inventors
Carl Holm
Arvid H. Johnson
By Clayton L. Jenks
Attorney

March 29, 1927.
C. HOLM ET AL
LABELING MACHINE
Filed March 13, 1923 7 Sheets-Sheet 2
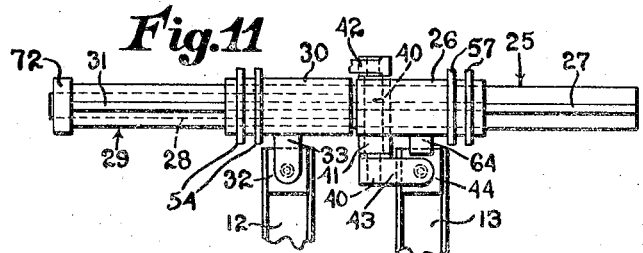
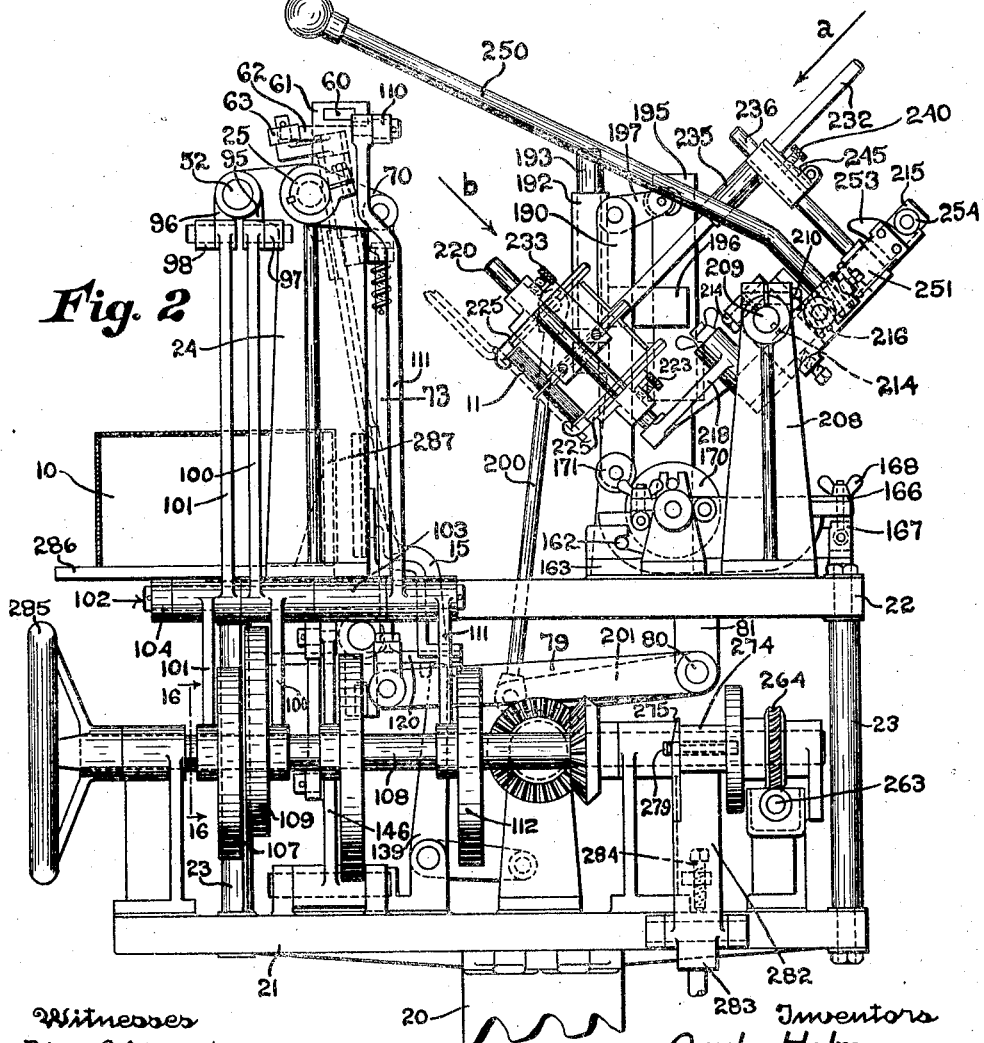
Witnesses
Harold W. Eaton
Leah A. Sessions
Inventors
Carl Holm
Arvid H. Johnson
By Clayton L. Jenks
Attorney March 29, 1927. 1,622,381
C. HOLM ET AL
LABELING MACHINE
Filed March 13, 1923 7 Sheets-Sheet 3
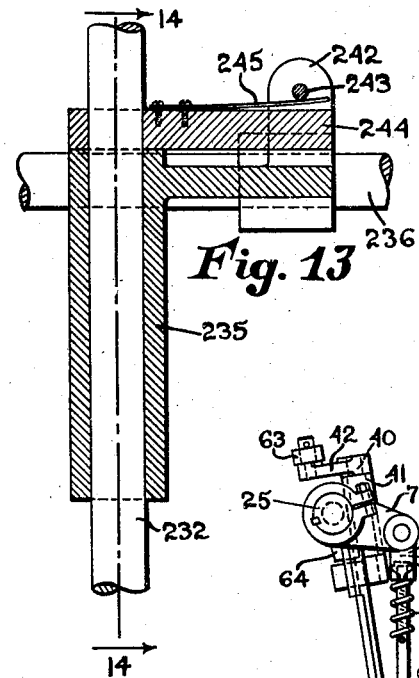
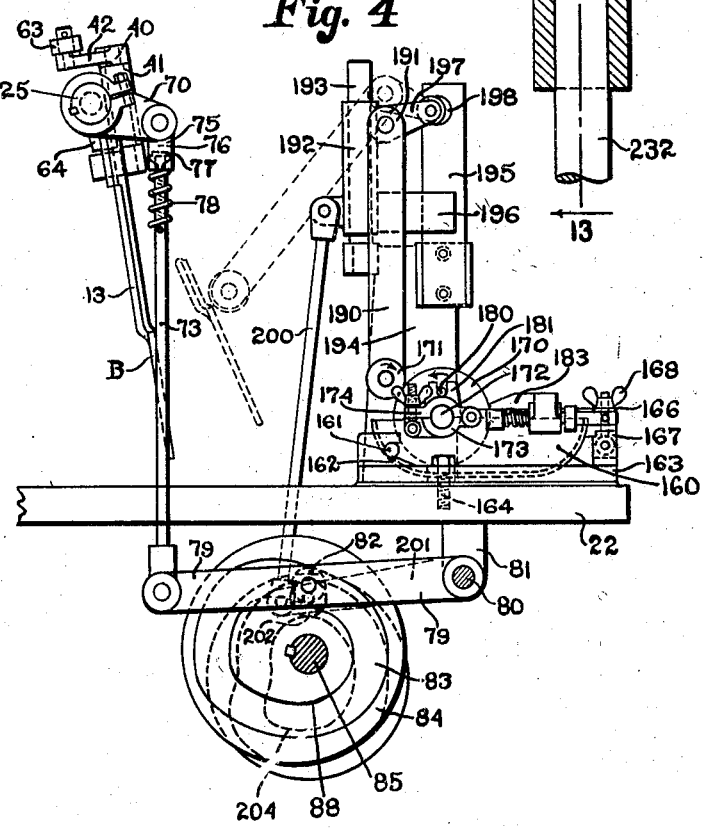
Witnesses
Harold W. Eaton
Leah A. Sessions
Inventors
Carl Holm
Arvid H. Johnson
By Clayton L. Jenks
Attorney March 29, 1927.
C. HOLM ET AL
1,622,381
LABELING MACHINE
Filed March 13, 1923
7 Sheets-Sheet 4
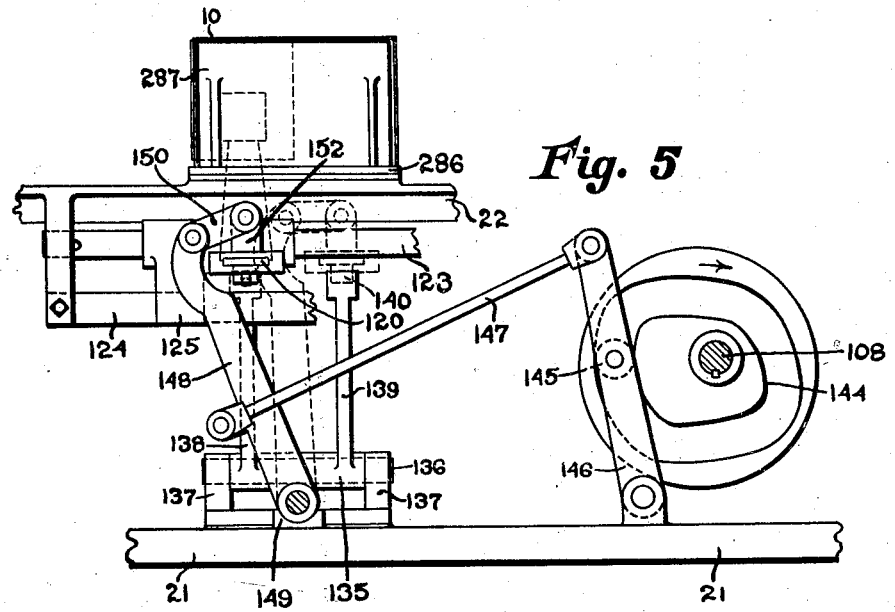
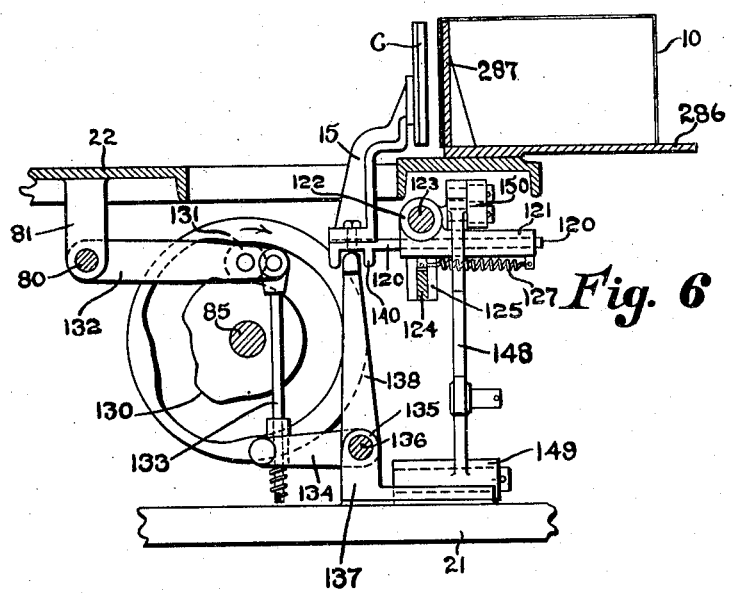
Witnesses
Harold W. Eaton
Leah A. Sessions
Inventors
Carl Holm
Arvid H. Johnson
By Clayton R. Jenks
Attorney March 29, 1927.　　　　C. HOLM ET AL　　　　1,622,381
LABELING MACHINE
Filed March 13, 1923　　　7 Sheets-Sheet 5
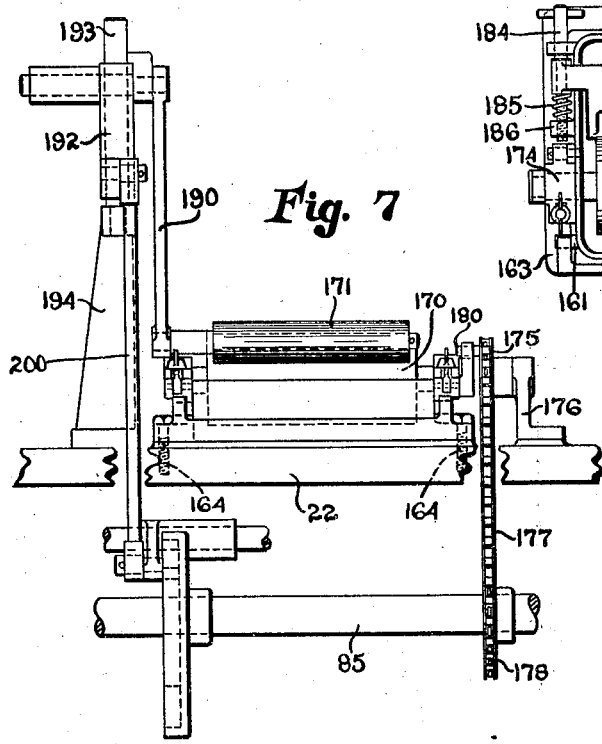
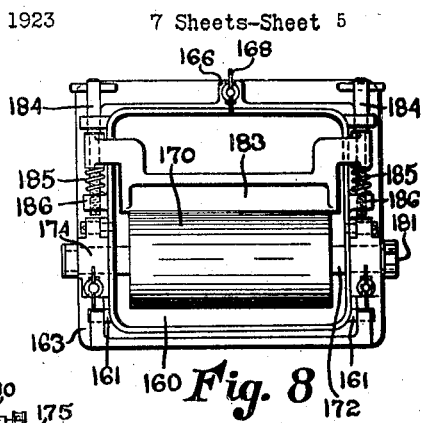
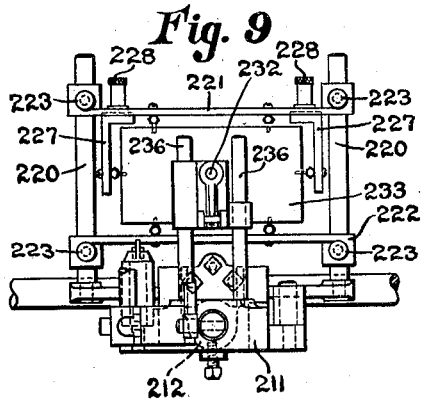
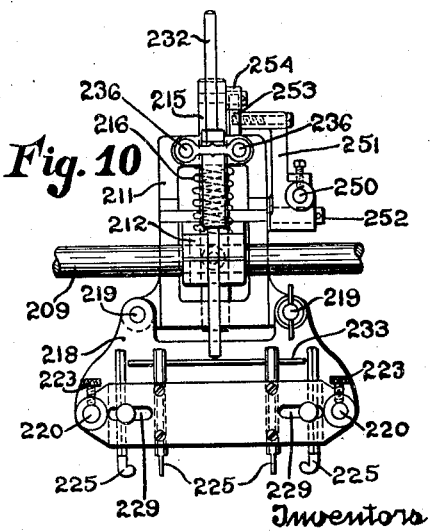
Inventors
Carl Holm
Arvid H. Johnson March 29, 1927.
C. HOLM ET AL
1,622,381
LABELING MACHINE
Filed March 13, 1923
7 Sheets-Sheet 6
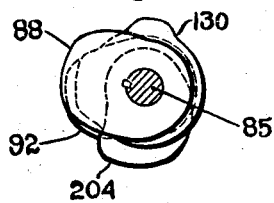
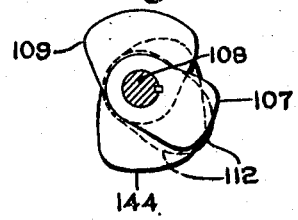
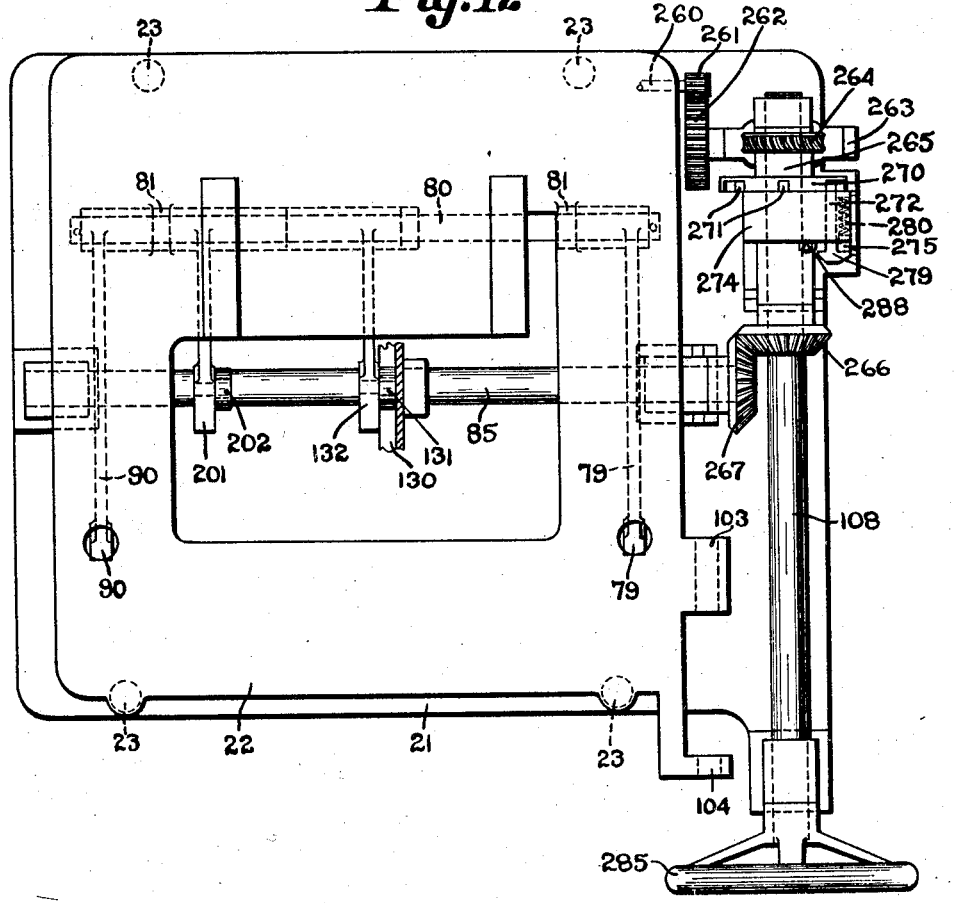
Inventors
Carl Holm
Arvid H. Johnson March 29, 1927. 1,622,381
C. HOLM ET AL
LABELING MACHINE
Filed March 13, 1923 7 Sheets-Sheet 7

Witnesses
Harold W. Eaton
Leah A. Sessious

Inventors
Carl Holm
Arvid H. Johnson
By Clayton R. Jenks
Attorney

Patented Mar. 29, 1927.

1,622,381

UNITED STATES PATENT OFFICE.

CARL HOLM AND ARVID H. JOHNSON, OF WORCESTER, MASSACHUSETTS.

LABELING MACHINE.

Application filed March 13, 1923. Serial No. 624,839.

Our invention relates to a labeling machine and more particularly to an automatic mechanism for applying adhesive to a label and affixing it to a box or other article.

One common form of apparatus employed for pasting labels on bottles comprises two separated pickers which are adapted to apply gum to the ends of a label, remove it from a pack and then carry it to a position adjacent the bottle where a grip finger passing between the pickers presses the central portion of the label against the bottle. While the label is thus held the pickers are withdrawn and two wipers are then caused to brush the gummed ends of the label onto the bottle. In such a construction it is necessary that the pickers be separated to permit the grip finger to pass therebetween, hence the pickers which receive the gum from a transfer roll cannot apply it to the whole surface of a label. As a result, a short label is not properly glued to the bottle because of its central portion being wholly uncovered with glue. In fact a very short label cannot be applied by such a mechanism. If on the other hand the label is long, the gumming surface of each picker must still be of small area, since a large sized picker as heretofore constructed and arranged cannot be readily pulled from contact with the label by the grip finger, owing to the adhesive strength of the gum or the danger of tearing the relatively weak label paper. For these and other reasons, the bottle labeling machines have not been found well adapted for labeling boxes and large flat surfaced articles, hence such articles, and particularly those of large size are usually labeled by a hand operation which is slow, laborious and expensive. The various types of mechanisms which have been proposed for this purpose have been found to be unsatisfactory due to their dripping gum onto the box or its support, tearing the label, applying insufficient gum thereto or otherwise improperly carrying out the required operation.

It is accordingly a main object of our invention to overcome such difficulties and to provide a simplified form of mechanism which may be economically operated for applying labels to boxes and the like automatically.

A further prime object of our invention is to provide an automatic mechanism which will gum substantially the entire area of the surface of a label, whether short or long, and then apply the label neatly to a box side.

Another object is to so construct and arrange the members of a box labeling mechanism that labels may be successively removed by gummed pickers from a pack and transferred to and pressed onto the sides of boxes without smearing the exposed box faces with gum.

A still further object is to provide a gum transfer and picking mechanism which is capable of applying a viscous adhesive to a large area of a label and may thereafter be stripped easily from contact therewith without danger of injuring the label.

A further object is to eliminate the necessity for wiping the label frictionally across its surface to cause it to adhere and to provide a mechanism which will press the label directly onto the box surface without straining the label fibres longitudinally.

A further object is to provide an improved gum transfer and picker mechanism the parts of which may be readily adjusted in correct relative position for transferring an even coating of gum to the label.

A further object is to provide a label pack holding device which may be adjusted for various sized labels and is capable of properly presenting the labels successively to the gummed pickers and permitting the bottom label to be withdrawn easily from the pack.

A still further object is to provide a label holder which gives a yielding but uniform resistance to the pressure of the pickers and permits but a limited upward movement of the pack and thereafter returns the pack to its lowermost position.

Further objects are to improve the construction and arrangement of various essential features of a labeling machine; and with these and other objects in view as will be apparent in the following disclosure, our invention resides in the combination of parts set forth in the specification and covered by the claims appended hereto.

Referring to the drawings, illustrating one embodiment of our invention, in which like reference numerals indicate like parts:

Fig. 2 is a similar side elevation of the machine;

Fig. 4 is a fragmentary elevation of a picker operating mechanism and the roll gumming mechanism;

Fig. 5 is a fragmentary front elevation of the presser operating mechanism;

Fig. 6 is a fragmentary side elevation corresponding with Fig. 5;

Fig. 7 is a fragmentary front elevation showing the picker gumming mechanism;

Fig. 8 is a top plan view of the gum trough and gumming roll and supporting mechanism;

Fig. 9 is a view taken in the direction of the arrow "a" shown in Fig. 2 of the label holding device;

Fig. 10 is a view taken in the direction of arrow "b" in Fig. 2 of the label holding device;

Fig. 11 is a fragmentary front elevation of the suport for the picker arms, showing the carrying sleeves in position;

Fig. 12 is a top plan view of the upper table and clutch and driving mechanism, with the picker gumming and label-holding mechanisms removed;

Fig. 13 is a sectional view on the line 13—13 of Fig. 14 showing the device for limiting the upward movement of the label pack follower rod;

Fig. 14 is a view on the line 14—14 of Fig. 13;

Fig. 15 is a fragmentary section on the line 15—15 of Fig. 1, which diagrammatically shows the timed relation of the inner surfaces of the cam grooves;

Fig. 16 is a similar view on the line 16—16 of Fig. 2; and

Figs. 17 to 26 inclusive are diagrammatic illustrations showing the operation of the machine.

In accordance with one form of our invention, we provide a machine for labeling boxes and the like which comprises pickers adapted to transfer a suitable adhesive to a desired portion or to substantially the entire face of a label and means to apply the label to the box. For this purpose we may employ two pickers which are separately movable and so arranged that after applying gum to the label, one picker may be removed while the other transports the label from the pack location to a position over the article to be labeled. Our preferred form of mechanism to affix the label to the box comprises a presser finger adapted to move over the free end of the label and press the exposed gummed surface upon the box, after which the supporting picker may be removed and the remainder of the label pressed or wiped into place, and preferably by a further movement of the presser finger. The pickers are given a coating of gum by suitable means, such as a transfer roller which is supplied with gum from a reservoir and is arranged to move relative to the pickers and in contact with their label carrying surfaces, and preferably as the pickers are moving towards the label pack. This pack is suitably mounted in a holder so that a lower unprinted face of a label is exposed and may be withdrawn by adhering to a picker. The various parts of the mechanism are arranged to move in timed relationship and in proper sequence and preferably under the control of cam mechanism which will carry on the various operations automatically and expeditiously.

*Diagrammatic description.*

Figure 18:
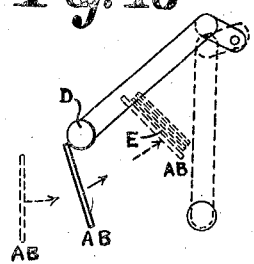
Figure 19:
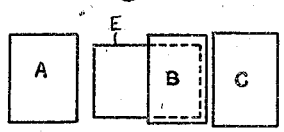
Figure 20:
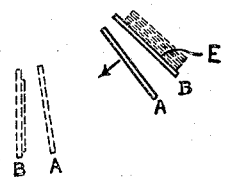
Figure 21:
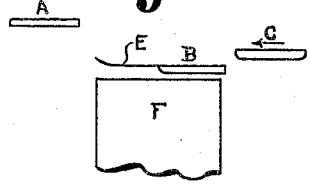
Figure 22:
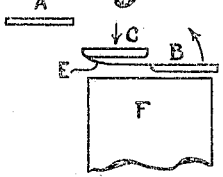
Figure 23:
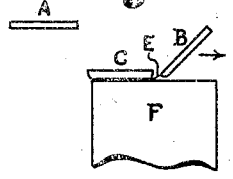

As one specific embodiment of our invention, we have shown in the drawings a machine particularly adapted for labeling boxes. In order to clarify the following description of this mechanism, reference should first be made to Figs. 17 to 26 inclusive, which illustrate diagrammatically one method of procedure embodied in this invention. In accordance therewith, we employ two pickers A and B which are separately movable and have gumming surfaces each preferably as large as half of the label. These pickers are adapted to be swung, as shown in Fig. 18, from a vertical position to contact with the under label E of a pack and both gum the label and transport it to a position adjacent the box to be labeled. During the upward movement of the pickers a gum transfer roller D sweeps downwardly across the pickers and applies a coating of gum thereto. The under label is withdrawn from the pack due to its adherence to the gummed surface of a picker. Since the pickers preferably cover the entire surface of the label, it is first necessary to remove one picker from the label so that a part of the gummed label surface may be exposed, as illustrated in Fig. 19, for application to the box. To this end we prefer to withdraw picker A from the label while picker B is held stationary against the pack, as shown in Fig. 20, after which picker B is moved to carry the label downwardly to the position shown in dotted lines in Fig. 20. The picker A when withdrawn from the label is moved laterally to the position shown in full lines in Fig. 19 and dotted lines in Fig. 20 so that it will not interfere with subsequent operations.

Figure 24:
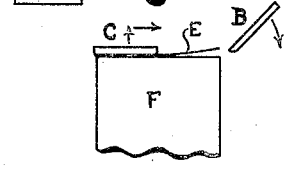
Figure 25:
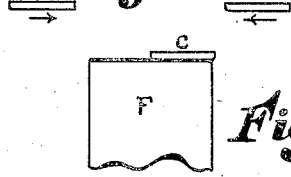
Figure 26:
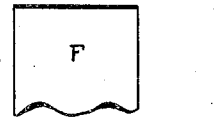

Of the various means which may be utilized to press the exposed label surface onto the box, we preferably employ a presser finger C. This finger, after picker A has moved to one side, is caused to travel from the position shown in Fig. 21 to the position shown in Fig. 22, after which it moves towards the box F and presses the exposed half portion of the label against the box. In order that the picker B may be easily removed from the label without tearing it, we prefer not to slide the picker in the plane of the label but to twist or rotate it to the position shown in Fig. 23, so that moving it laterally to the position shown in Fig. 24 serves to strip it easily from the label. The remainder of the label may then be suitably affixed to the box. This is preferably accomplished by lifting the presser finger C slightly and moving it laterally as shown by the arrow in Fig. 24 and then towards the box to press the label thereon as shown in Fig. 25. Afterwards the presser finger C is moved to its initial position at one side of the box as shown in Fig. 26 and the pickers A and B are moved together and caused to swing upwardly to obtain another label.

Referring now to Figs. 1 to 16 inclusive, we have there shown a mechanism to label a box 10 with a label picked from a pack 11 by a suitable gumming and picking mechanism, which preferably comprises a single oscillatory picker arranged to pick a label from the pack, and means to gum a further portion of the label and leave it exposed for application to the box. The gumming and picking device illustrated consists of two oscillatory members 12 and 13, hereinafter termed the pickers, one of which, 12, serves merely to apply gum to the label while the other, 13, gums the remainder of the label and then transports it to a position where it may be applied to the box. These pickers are coated with adhesive from a transfer roller which is moved across the flat faces A and B of the pickers while they move towards the label pack. The gumming picker 12 is then withdrawn to leave an exposed label face, whereupon the carrying picker 13 transports the label to a position near the box, where the exposed label face is applied thereon by a flat surfaced presser finger C carried on the movable arm 15.

*Picker mechanism.*

Figure 1:
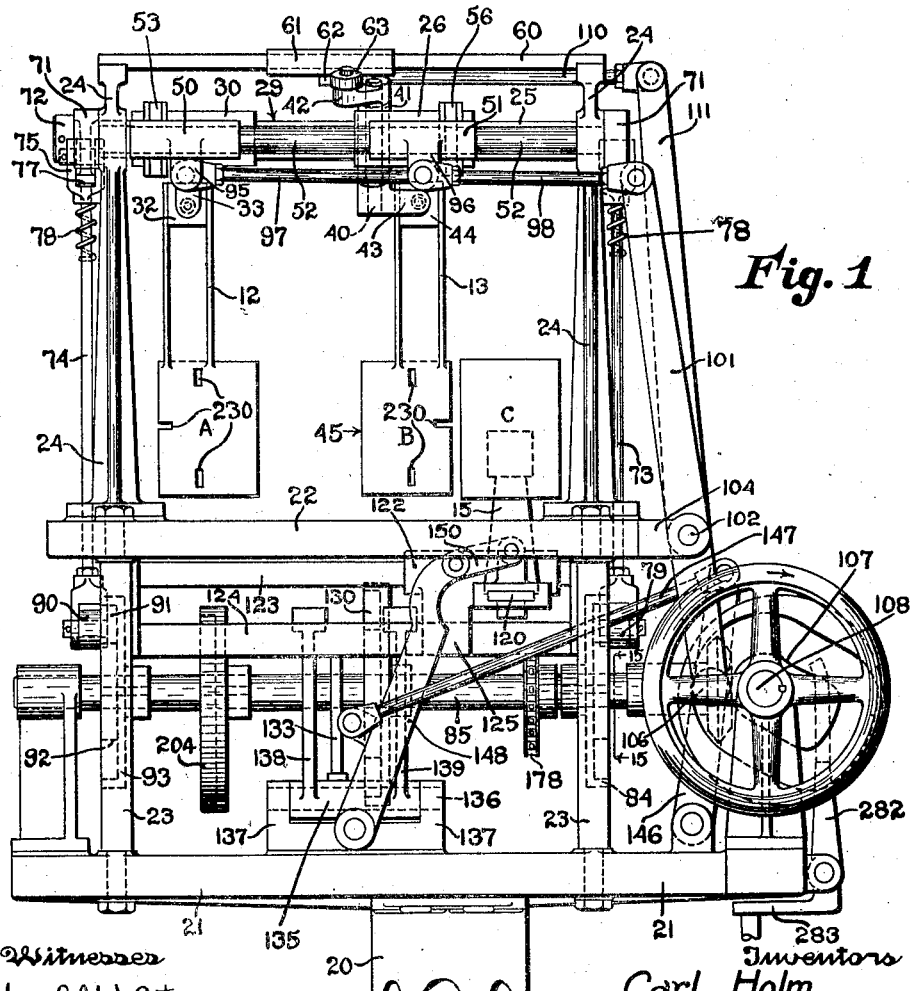
Fig. 1 is a front elevation of a machine embodying our invention, from which parts have been removed for the sake of clarity of illustration.
Figure 17:
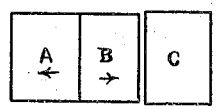

Referring to Figs. 1 and 2, this mechanism is mounted on a pedestal 20 carrying a lower table 21. An upper table 22, which has a central opening as shown in Fig. 12, is supported by means of standards 23 on the lower table. The uprights 24 mounted on the upper table carry the picker supporting mechanism. As shown particularly in Figs. 1, 2, 3 and 11, a shaft 25 is rotatably mounted in suitable bearings in the tops of these standards 24. A sleeve 26 is slidably mounted on the shaft, as shown in Fig. 11, and keyed thereto by the key 27 which prevents relative rotation of the two parts. The left hand end of the shaft 25 has a reduced portion 28 which carries a sleeve 29 rotatably mounted thereon. A second sleeve 30 is slidably mounted on sleeve 29 and is keyed thereto by the key 31 which permits the outer sleeve to rotate with but slide longitudinally along the inner sleeve.

The sleeve 26 is adapted to carry suspended therefrom the picker 13. Sleeve 30, the picker 12, and associated parts are so arranged that the axis of shaft 25 and the effective surfaces A and B of the picker arms 12 and 13 are in substantially the same plane. Also we prefer that the rectangular surfaces of the pickers meet at their adjacent edges and leave substantially no ungummed space therebetween when they are in contact with the label pack. The picker arm 12 is suspended from the sleeve 30 by means of a block 32 fastened to the upper end of the arm 12, this block being fixed to a lug 33 projecting downwardly from the sleeve 30. Hence rotation of sleeve 29 serves to swing the picker arm 12 and its gum carrying surface A to gum the label and longitudinal movement of sleeve 30 serves to carry the picker into an inoperative position, as above explained.

It is intended that the picker B mounted on the arm 13 shall not only swing laterally and slide longitudinally like picker A but that it shall also be capable of twisting relative to its pendulum line of suspension. To this end we may employ the following construction: A stud 40 mounted in a lug 41 projecting from the surface of the sleeve 26, the axis of the stud being parallel with the line of suspension of the picker but at one side of the axis of shaft 25. This stud is rotatably held in the lug by means of a crank arm 42 fixed to the stud and serving as a collar. On the lower end of the stud is fixed a further crank arm 43 which carries a block 44 fixed on the upper end of the picker arm 13. The stud 40 is axially parallel with the left-hand edge 45 of the flat surfaced picker member B and preferably aligned with a line removed from said edge by about the thickness of the picker member B. It will, therefore, be seen that the picker B may swing about the axis of the shaft 25 or it may slide in the plane of its gum-carrying surface, or it may be rotated about a line coinciding with the axis of the stud 40.

Connections are made with the sleeves 30 and 26 to slide them on their supports. In our preferred form, we provide yoked sleeves 50 and 51 slidably mounted on the rod 52 mounted fixedly in the upper end of the standards 24 in front of and parallel with the shaft 25. The sleeve 50 has a laterally projecting Y-shaped yoke 53 which engages two parallel flanges 54 on the outer surface of the sleeve 30, these parts being so constructed that longitudinal movement of the sleeve 50 on the rod 52 will cause the sleeve 30 to move likewise in the same direction. Similarly, the sleeve 51 is provided with a yoke 56 engaging flanges 57 on the sleeve 26.

In order to provide mechanism for twisting the picker B about the axis of stud 40, a further cross slide member 60 is fastened to the two uprights 24 and a sleeve 61 is slidably mounted thereon. A finger 62 projecting laterally from this sleeve is adapted to engage a roller 63 on the end of the crank arm 42 which is mounted on the upper end of the stud 40. It will therefore be seen that by sliding the upper sleeve 61 into contact with the crank arm 42, the picker B is twisted from its normal plane of action. The sleeve 26 is provided with a stop 64 (Fig. 11) which is adapted to engage the upper end of the picker arm 13 and hold the surface B parallel with the surface A of the picker support 12. A spring 65 (Fig. 3) is provided to hold the arm normally against this stop so that the turning of the crank arm 42 must be against the tension of the spring 65.

Figure 3:
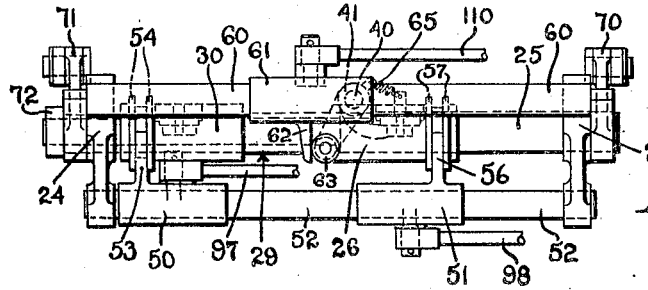
Fig. 3 is a top plan view of the picker supporting mechanism.

In order to swing the picker arms 12 and 13, the shaft 25 is made long enough to project through and beyond the standards 24 so that crank members may be fastened, one to the shaft and the other to the sleeve 29 for rotating the pickers independently. As shown in Fig. 4, a crank arm 70 is keyed and clamped to the end of the shaft 25. Similarly, a crank arm 71, shown in Figs. 1 and 3, is keyed to the sleeve 29 and is held in place by means of a collar 72 (Fig. 11) screw-threaded to the end of the shaft 25 and abutting against the end of sleeve 29. The crank 70 is turned by means of a cam operated connecting rod 73 and the crank 71 is operated by means of a connecting rod 74:

Since the pickers A and B must be presented to the gumming roll in the same plane so as to receive an even coating of gum, we preferably provide a spring connection which will make it possible for the gumming roll to hold one picker back, if it happens to be in advance of the other. To this end, the member 75 (Fig. 4) which is pivotally conected to the crank 70, has an enlarged slot 76 within which the head 77 of the connecting rod 73 is located. A helical spring 78 surrounding the rod and having its lower end fastened thereto butts against the bottom of the member 75 thus tending to hold the connecting rod downwardly and the picker forward. A similar construction is provided for the crank member 71, the same reference numerals being applied to the corresponding parts shown in Fig. 1. The various connecting rods employed in the machine are formed with right and left hand threads interfitting with their cooperating parts which permit the mechanism to be adjusted to a desired degree of acuracy of movement.

The lower end of the connecting rod 73 is connected to a cam follower lever 79 which is pivotally mounted on a shaft 80 carried by lugs 81 projecting downwardly from the base 22 of the machine, as shown particularly in Figs. 4 and 12. This follower lever has a roller 82 pivotally mounted thereon which rides in a cam slot 83 formed in the side of a grooved cam wheel 84 mounted on a cross shaft 85 which is journaled in suitable bearings on the machine. The inner surface 88 (Fig. 15) of the cam member determines the movement of the cam follower and therefore the picker controlled thereby.

The rod 74 is similarly connected to a lever 90 which carries a cam follower 91 (Fig. 1) pivotally mounted on the side thereof. This cam follower 91 engages a grooved cam surface 92 on the cam wheel 93 mounted on the shaft 85 (see Fig. 1). The follower lever 90 is pivotally mounted at one end on the shaft 80 similar to the mounting of lever 79 shown in Fig. 4. These various cams are fixed to the shaft 85 so that upon rotation thereof the pickers are caused to swing in a predetermined manner depending upon the shapes and relative locations of the cams, as illustrated in Fig. 15, it being intended that the pickers shall move in unison while being gummed and shall contact with the pack at the same time.

The sliding of the pickers longitudinally is accomplished by moving the yoked sleeves 50 and 51 along the shaft 52. The sleeves 50 and 51 have lugs 95 and 96 projecting therefrom, to which are connected the rods 97 and 98. These connecting rods 97 and 98 are respectively pivotally fastened to the ends of levers 100 and 101 (Figs. 1 and 2) which are fulcrumed on a shaft 102 mounted in bearings 103 and 104 (Fig. 12). Fastened to the bottom end of the lever 101 (Figs. 1 and 2) is a cam follower roller 106 which rides in a grooved cam 107 mounted on the shaft 108 suitably journaled on the machine frame. The other lever 100 is operated by a similar construction which comprises a cam 109 mounted on shaft 108 adapted to move a follower connected to lever 100. In Fig. 16 we have shown the relative positions of the effective surfaces of the two cams 107 which operates picker B, and 109 which operates picker A, to slide them laterally as required.

As above stated, the picker B is intended to be twisted about a substantially vertical line, in the form illustrated, by moving the slide 61 to turn the crank arm 42. This slide is moved longitudinally of its supporting member 60 by means of a connecting rod 110 which is pivotally attached to a substantially vertical lever 111 pivotally mounted on the shaft 102. The lower end of this lever 111 likewise carries a cam follower roller which engages the cam 112 (see Figs. 2 and 16) on shaft 108, this cam being so shaped and located that it will turn the picker at the proper moment.

It will therefore be seen that with the construction so far described the pickers A and B are arranged to be swung simultaneously into contact with the bottom label 11 in the label carrier. Thereafter, picker A is withdrawn from the label after applying its coating of gum thereto, while B remains stationary and holds the label against the lateral pull of picker A during the period of the latter's withdrawal. Then the picker A is moved longitudinally to the position shown in Fig. 21, by means of the connecting rod 97 and slide 50 which is yoked to the supporting sleeve 30 of the picker, this being caused by the lever 100 and cam 109. Thereafter the picker B is swung downwardly until it is in position close to the surface of the box 10 to be labeled. One-half or a substantial portion of the gummed surface of the label remains exposed and in position to be applied to the box. This is preferably accomplished by a suitable mechanism capable of pressing the label onto the box, and to this end we have provided a construction as illustrated particularly in Figs. 1, 5 and 6.

*Presser mechanism.*

This presser mechanism comprises the presser finger 15 carrying the member C which is mounted for movement in two directions, so that it may press the exposed label portion onto the box and then be moved over to press the other half of the label and thereafter be removed to a starting position to permit a new label to be brought up to another box. The member C preferably consists of a rectangular flat surfaced member made of a resilient or cushioning material, such as rubber or felt, capable of pressing the label into the depressions of an uneven surface without tearing it. The presser finger 15 which carries the cushioning member C is bolted or otherwise fixed to a slide member 120 which is slidably mounted in an extension 121 on the sleeve 122. The sleeve 122 is in turn slidably mounted on a rod 123 fixedly mounted on the standards 23 of the machine base. A second cross bar 124 is also mounted on the standards below the rod 123, and a yoke 125 depending from the sleeve and engaging opposite sides of this bar prevent the sleeve from turning rotatively about the rod 123. The bar 120 being of rectangular cross section, as shown in Figs. 1 and 5, prevents the presser finger turning about its support. A spring 127 fastened to the bar 124 and the sleeve 121 tends to hold the presser finger away from the box 10, as shown particularly in Fig. 6.

The presser finger 15 may be moved toward the box by means of a cam 130 which is mounted on the shaft 85. The cam follower 131 adapted to ride in the grooved cam 130 is mounted on a lever 132 which is pivotally suspended from the shaft 80 supported on the under side of the base 22. The outer end of the lever 132 has a connecting rod 133 pivotally attached thereto and the lower end of this rod is held by a spring-pressed connection to an arm 134 of a bell crank lever which has forked portions adapted to engage the presser finger when it is in either one of two positions. The arm 134 is integrally connected to a sleeve 135 mounted on the short shaft 136 which is journalled on the supports 137 attached to the base of the machine. Two upwardly projecting forks 138 and 139 are integrally fastened to this sleeve and adapted to engage a yoke 140 on the under side of the slide member 120 (see Fig. 6) so that when the presser finger is moved to such a position that the yoke 140 straddles either one of the arms 138 or 139, operation of the cam member will push the presser finger forward against the box. These two positions of the presser finger are those required for pressing the two halves of the label onto the box. The two positions of the slide 121 are shown, one in full and the other in dotted lines, in Fig. 5, but only one position of the presser C is shown.

In order to move the presser finger 15 longitudinally from one-half of the label to the other half, and to remove it to an inoperative position, we employ the mechanism particularly shown in Figs. 5 and 6 which includes a cam 144 mounted on shaft 108. This cam is engaged by a cam roller 145 on the lever 146 which is pivotally mounted on the base 21 of the machine. The upper end of the lever 146 has pivotally connected thereto a link 147 which is likewise connected at its other end to the middle portion of a further lever 148 pivoted on a projection 149 on the base 21. The lever 148 is connected by a link 150 with a projection 152 on the sleeve 122.

As shown in Fig. 6, the cam 130 has two risers thereon which tend to move the presser finger forward at proper times. The timed relation of the various cams is such that presser C not only pushes the exposed half of the label onto the box, but holds the label there while the cam 112 is operating through the connecting rod 110 and slide member 61 to twist the picker B substantially about its end 45 to remove the picker B from the label. This cam 112 is so constructed that the picker B is moved angularly to approximately 45 degrees from its original position, so that it may be moved laterally and stripped from the label gradually without danger of tearing it. Since the presser C at this time occupies the position formerly occupied by the picker A, the picker B is free to move to the right to the position formerly occupied by presser C, as shown in Fig. 24. Then the presser C is moved by its cam to the position formerly occupied by B with the yoke 140 straddling the upper end of the lever 139, whereupon the second riser portion of the cam 130 serves to move presser C again to press down the second half of the label. It is to be noted that with this construction, we may use the same presser for various sizes of labels.

Gumming mechanism.

While gum may be applied to the pickers by various types of mechanism within the scope of our invention, our preferred form of gumming mechanism may comprise the construction shown particularly in Figs. 2, 4, 7 and 8. A trough 160 for holding a supply of a suitable adhesive is mounted on the support 22. In order that the trough may be removable we provide pivot pins 161, see Figs. 4 and 8, on the sides of the trough, which are suported in laterally extending slots 162 in the frame 163. This frame is adjustably positioned on the table 22 by means of cap screws 164 (Fig. 7) which pass through elongated slots in the side of the frame. The other end of the reservoir has a slotted lug 166 which rests on the upright member 167 of the frame, and is adapted to be locked thereto by means of a winged nut on a screw 168 which is pivotally mounted on the frame and removably engages the slot in the lug.

A gumming roller 170 is mounted for contact with the bath of gum and is adapted to apply gum to a second gum-transfer roller 171 (D in Fig. 18) which is mounted to swing across the pickers. The gumming roller 170 is mounted on a shaft 172 journaled on the opposite sides of the gum trough 160. These journals, as shown particularly in Fig. 4, permit removal of the gumming roller and comprise a split bearing, of which the lower half 173 is integral with the trough and the other half 174 is pivotally mounted thereon and adapted to be clamped in fixed position by means of a bolt and wing nut.

In order to rotate the gumming roller, a sprocket 175 journaled on the upright 176 on the frame, is driven by means of a chain 177 from another sprocket 178 on shaft 85 in the base of the machine. A pin 180 on the side of the sprocket engages a driving dog 181 fixed on the end of the gumming roller, whereby the roller may be driven whether or not it is in alignment with the sprocket wheel 175. This permits the gumming roll to be easily removed from the trough and to be swiveled about a vertical axis to make the necessary adjustments for applying an even coating of gum to the transfer roller.

A scraper 183 is adjustably positioned in the reservoir to provide an even thickness of gum coating on the gumming roller. This scraper has sleeves on its ends slidably mounted on the pins 184 and is spring-pressed by springs 185 away from the roller. The pins 184 are threaded into lugs 186 on the trough and may be manually adjusted to position the scraper.

One suitable manner of transferring a coating of gum from roller 171 to the pickers involves swinging the roller downwardly across the faces A and B as they move upwardly. In our preferred construction, the gum transfer roller 171 is pivotally mounted at one end on the lower end of a swinging bar 190 which is pivoted to a lug 191 projecting laterally from a vertical sleeve 192. This sleeve is slidably mounted on a rod 193, which is fixed to the upright 194 mounted on the base 22. The upright 194 has a vertical extension 195 which is engaged by a yoke 196 projecting laterally from the sleeve 192, whereby rotative movement of the sleeve is prevented. The lever 190 is L-shaped and serves as a bell crank lever, the upper end 197 having a roller thereon mounted to ride in a slot 198 in the upright 195. It will therefore be seen that vertical movement of the sleeve 192 causes the lever 190, which carries the roller 171, to swing outwardly.

These parts are moved automatically in timed relation to the picker mechanism by the following preferred construction: A rod 200 is fastened pivotally to a lug on the side of the sleeve 192 and the lower end of this rod is connected to a lever 201 which has a cam follower roller 202 pivotally mounted thereon. This roller rides on the cam surface 204 of a grooved cam which is mounted on the shaft 85. The lever 201 which is in back of the lever 79 shown in Fig. 4, is also pivotally mounted at one end on the shaft 80. The cam 204 is so shaped and positioned relative to the other cams that the gumming roller is caused to travel upwardly before the pickers reach a gumming position and then to swing downwardly across the upwardly moving pickers and transfer a coating of gum thereto. It will be obvious that the gum transfer roller 171 has received a coating of gum from the roller 170 due to frictional contact between the two rollers which causes the smaller roller to rotate and receive its coating.

After the gum coating has been applied to the pickers the pickers then swing upwardly into contact with the bottom label in the pack, as shown in dotted lines in Fig. 2. It will now be clear why the picker swinging arms are spring-pressed, since it is necessary that the gum transfer roller in sweeping across the two pickers apply the same thickness of coating to each of the pickers, so that if one is slightly in advance of the other, the two pickers will be held in the same plane while the gum is being transferred thereto. It will also be noted that gum is applied to the pickers while they are swinging so that no time is lost in this part of the operation.

*Label carrier.*

The pack of labels is held in an adjustable position relative to the pickers and the carrier therefor is preferably constructed so as to accommodate labels of different sizes. Our preferred construction is shown particularly in Figs. 2, 9 and 10. The label-carrying mechanism is mounted on standards 208, of which but one shows in Fig. 2. A cross rod 209 is mounted near the upper ends of these brackets in suitable split bearings in the standards, (Fig. 2) and may be set in an adjusted position by means of the cap screw 210 passing through the bifurcated ends of the bearings. A hollow rectangular frame 211 which carries the label holder is removably mounted on the rod 209 by means of a split block 212, which is adapted to be clamped to the rod 209 by means of a cap screw 213. A key 214 is provided between the clamping block 212 and the rod which permits sliding the clamping block lengthwise of the rod. The frame is supported on the block 212 by a rod 215 which passes upwardly through the block 212 and through openings in the upper and lower cross portions of the frame 211, thus permitting the frame to slide relative to the block. As a resilient support for the frame, a helical spring 216 surrounds the rod 215 and presses at its lower end against the block 212 and at its upper end against the inner side of the upper cross arm of the frame, thereby tending to hold the frame upwardly against the weight of the label carrier. The label pack is supported by means of a plate 218 which is mounted on studs 219 projecting from the frame 211. Projecting at right angles from the plate 218 are two parallel posts 220 which carry two plates 221 and 222 adjustably mounted thereon, as shown in Fig. 9. Screws 223 are provided to lock these plates in any desired adjusted position.

In order to hold the labels in the hollow frame thus provided, and permit the pickers to contact with substantially the whole surface of the under label we prefer to support the pack by small fingers 225 which contact with the label only near its edges and permit ready withdrawal of a label therefrom. Two of these fingers are fixed on each of the bars 221 and 222, which as explained are adjustable to provide for handling different widths of label. In order that labels of different lengths as well may be used, the fingers which are intended to engage the ends of a label are mounted on slide members 227 which have set screws 228 adapted to hold the slide members adjustably positioned in slots 229 of the plate 221. As shown particularly in Fig. 10, the fingers 225 have short inwardly projecting portions on which the label pack rests. If it is desired that the pickers contact with substantially the whole surface of the bottom label in the pack, we may provide slots and openings 230 in the pickers (Fig. 1) into which the fingers 225 project when the pickers contact with the label. These fingers and the pickers and their slots may be so shaped and located that a large picker may be used with smaller labels, or if preferred we may replace the old picker with one of correct size, when the label size is changed.

In order to hold the labels against the upward pressure of the pickers and feed the pack downwardly as labels are withdrawn, we may provide any suitable construction such as that illustrated in the drawings. As there shown we prefer to employ a follower rod 232 which rests on the back of a freely movable plate 233 placed on the top of the pile of labels, the weight of this rod serving to hold the plate and the labels properly positioned in the holder. The rod 232 is slidable in a sleeve 235 which is mounted on a pair of parallel cross rods 236 fixed to the frame 211.

We have provided a simplified construction which insures a proper feeding downward of the rod and permits only a limited upward movement as shown in Figs. 13 and 14. A flat portion 238 projecting laterally from the sleeve 235 carries two spaced sleeves 239 which are integral therewith and slide on the two rods 236. One of these is provided with a set screw 240 which is adapted to clamp the sleeve 239 to a rod 236 in any desired position. Two spaced lugs 242 project upwardly from the flat plate portion 238 and have a pin 243 fastened therebetween. A plate 244 which has a sliding fit on the rod 232 projects beneath the pin 243. A downward pressure on the outer end of the plate is furnished by a leaf spring 245 which is fixed to the plate and passes beneath pins 243. This plate is spaced from the flat member 238 by a projecting boss 246 on the sleeve 235. Due to the weight of the outwardly extending portion of the plate 244 and the spring pressure, there is a tendency for this plate to tilt downwardly and thus bind the plate on the rod 232. When the pickers strike the pack of labels and tend to push upwardly thereon, the upward movement of the rod 232 resting on the labels is limited by the spring-controlled plate 244, this plate being permitted to move upward easily only by the distance between the spring beneath the pin 243 and the plate. Upon removal of the pressure from the pickers, the plate and rod 232 settle back, and the rod may slide freely through the plate, as permitted by the position of the pack. This construction insures a constant pressure on the label pack due to the absence of compression springs and the fact that the weight of the rod 232 and the follower plate 233 are constant. The slight upward movement of the pack permitted by this mechanism permits the bottom label to be removed easily from the pack without binding the lower label against the projecting fingers which support it.

Since it may be desirable at times to permit the machine to operate without the pickers contacting with a label in the carrier, we provide means for lifting the carrier away from the uppermost position of the pickers. This may be accomplished through a handle 250 which is fastened to a cam member 251 pivotally mounted on a stud 252 projecting laterally from the frame 211. The upper end of this cam member has a cam surface 253 which is in engagement with a roller 254 mounted on a pin projecting laterally from the member 215, whereby when the handle is moved upwardly the member 215 is caused to move up against the pressure of the spring 216 and thus lift the carrier frame 211 and the contained labels from their normal positions. It will be noted that the labels and their carrier are mounted at an angle which is determined by the uppermost position of the pickers and that this angle may be adjusted as desired to insure proper contact with the pickers by swinging the carrier on the rod 209 or sliding it laterally. Movement of the label holder under the pressure of the pickers is prevented by contact of the roller 254 with the cam surface 253.

Driving mechanism.

In order to drive the various mechanisms above described, we provide a main power shaft 260 which is suitably driven and in turn drives through a gear 261 thereon a second gear 262. A worm shaft 263 on which gear 262 is mounted has a worm thereon driving a worm gear 264 on a sleeve 265 loosely mounted on the end of the shaft 108. This sleeve drives shaft 108 through a suitable clutch. A beveled gear 266 fixed to the shaft 108 meshes with a second beveled gear 267 on the end of the shaft 85 and serves to transmit power to the cams thereon, as shown particularly in Fig. 12.

While various forms of clutch mechanism may be employed we have here illustrated one which comprises a driving plate 270 which is fixed to the sleeve 265 carrying the worm gear 264. The plate 270 has various notches 271 adjacent its periphery with which a driving pin 272 may engage. This pin is carried in a lateral projection of a member 274 which is keyed to the shaft 108. The driving pin is adapted to be retracted to disengage the clutch by a finger 275 (Fig. 2) which is wedge shaped and adapted to slide beneath the head 279 of the pin and remove it from a driving position against the action of a spring 280 (Fig. 12) which is located between a projection on the pin and a lug on the member 274. The finger 275 is fixed on the side of a lever 282 which is pivotally mounted on the frame 21 of the base and is adapted to be moved either by foot or hand power through an operating crank arm 283 attached to the lever. As shown in Fig. 2, the lever 282 has a large flat portion which may be swung into position close to the member 274 fastened on the shaft 108 and act as a stop therefor. As the member 274 rotates, the overhanging part carrying the eccentrically mounted driving pin comes around against the top of the lever 282 at the same time that the finger 275 withdraws the pin from locking engagement, thereby insuring that the machine stops with the mechanism in a predetermined position. A set screw 284 may be provided in a lug projecting from the lever 282 in order to limit the motion thereof. A hand wheel 285 on the front end of shaft 108 serves for manual adjustment of the machine after the clutch has been disconnected, the pawl 288 (Fig. 12) holding the pin 272 retracted.

Operation.

The operation of this device will be obvious from the above disclosure and particularly in view of the introductory diagrammatic description of Figs. 17 to 26 inclusive.

If the article to be labeled is a hollow box, we may employ the simplified construction illustrated in Fig. 2 comprising support 286 having an upright extension 287 thereon adapted to receive the thrust of the presser finger. The box is placed open side downwardly over this member 287 and drawn back snugly thereagainst. It however is to be understood that various forms of automatic mechanism may be employed with our machine to present boxes successively to the action of the pickers and presser finger and without requiring manual labor therefor. After the box has been put in position the machine is set into operation, whereupon the two pickers A and B carried on their supporting arms 12 and 13, which have been separated during the previous operation, move together and swing upwardly towards the label pack. In the meantime the gum transfer roller 171, having received its coating of glue from the rotating roll 170, is swung upwardly by vertical movement of the sleeve 192 to which is connected the upper end of the lever 190 carrying the roller 171. The cam operating this swinging movement starts the roller on its return path just after the pickers come into contact with the roller and the movement of these parts is so timed that the roller rolls downwardly across the face of the pickers as they continue to swing upwardly and transfers a coating of gum thereto. The springs 78 make this operation flexible so that an extremely accurate adjustment of the timed relation of these parts is not neccessary.

The two pickers come into contact with the bottom label in the pack simultaneously and the upward motion of the pickers is yieldingly resisted by the gravity pull on the rod 232. This upward movement of the pack is however limited by the construction illustrated in Figs. 13 and 14 which serves to return the pack to its correct position upon removal of the picker. While picker B on the arm 13 remains stationary against the pack, arm 12 carrying the picker A is swung downwardly and then moved laterally to the position shown in Figs. 1 and 21. As soon as picker A is out of the way, picker B now swings downwardly and withdraws the bottom label from the pack owing to the adherence of the label thereto. The exposed surface of the label to which picker A applies its gum is brought by movement of picker B to a position adjacent the face of the box 10 to be labeled.

The presser C on the finger 15 is thereupon slid laterally past the rear face of picker B and against the back of the exposed portion of the label, thereby serving to straighten out the label if it has curled up during the previous step. This flat surfaced presser moves inwardly and clamps the gummed surface of the label against the box. The arm 13 is then twisted about a substantially vertical axis by movement of the sleeve 61 contacting with the crank arm 42, and soon as the picker is turned to a position about 45 degrees from the normal, the sleeve 26 carrying the picker arm is moved to the right by means of the sleeve 51 and its cam controlled connections. As soon as this picker B is out of the way the presser C is moved slightly away from the box by means of cam 130 and then is carried laterally by cam 144 from its first position where the U-shaped member 140 straddled the lever 138 to its second position in engagement with the lever 139. Whereupon, further movement of the cam 130 presses the finger 15 toward the box support 287. Thereafter the cam 130 in its continuing motion withdraws the presser finger and permits the removal of the box. The presser finger then is moved further to the right as shown in Figs. 1 and 26, then the sleeve 30 is moved again to the right and the pickers A and B are swung upwardly for obtaining another label.

While we have described but one form of device which embodies our invention, it should be understood that we are not limited to this specific construction but are entitled to broad equivalents of mechanism capable of accomplishing the same results, within the limits of the appended claims, and that other mechanical features and devices well known in this art may be employed with the essential elements of our labeling machine. It also is to be noted that various combinations of elements in this machine are capable of use in other forms of automatic labeling apparatus which do not embody all of the essential elements of our machine, hence the claims to such subcombinations of elements are to be so construed. It is clear that the term "box" as used in the claims is intended to cover any article capable of being labeled by our device.

Having thus described our invention, what we claim as new and desire to secure by Letters Patent is:—

1. A box labeling machine comprising a support for a box, a label holder, pickers arranged to apply gum to a surface of a label in said holder and transport the label to a position adjacent a box and mechanism cooperating therewith including a presser arranged to move towards the box and to press substantially the entire area of the label directly onto the box in a direction normal to the surface thereof.

2. A box labeling machine comprising a label holder, picker mechanism to apply a coating of gum to substantially an entire surface of a label in said holder and present an exposed gummed surface thereof to a box and a presser arranged to contact with the entire surface of the label and to move in a direction normal to the surface thereof to press it directly onto the box.

3. A box labeling machine comprising a label holder, a gum reservoir, movable pickers having flat surfaces as large as a label, means to transfer gum from said reservoir to said surfaces, mechanism to move the pickers to apply a coating of gum to substantially an entire surface of a label in said holder and thereafter present an exposed gummed label surface to a box and a presser movable towards the box and cooperating with said pickers to press the entire gummed label directly onto the box.

4. A box labeling machine comprising two pickers having gum transfer surfaces as large as the label and arranged to contact with substantially an entire surface thereof, means to move said pickers to apply a coating of gum to a label and present the label to a box, means to remove one of the pickers from contact with the gummed label and thereby leave an exposed gummed surface, means to press the exposed surface onto a box and means to press the remainder of the label directly onto the box.

5. A box labeling machine comprising a label holder, two pickers adapted to have gum applied thereto, means to move said pickers to transfer gum to a label, means to remove one picker from contact with the label and thereafter cause the other picker to transport the label from the holder to a position adjacent the box, and means to affix the label to the box.

6. A box labeling machine comprising two pickers arranged to apply gum to two areas of a label and coat the entire surface thereof, means including one of said pickers to transport the label to a position adjacent a box and means to affix said label areas successively to the box.

7. A box labeling machine comprising two pickers adapted to carry a transfer coating of glue, means to move them into contact with and thereby coat the entire surface of a label, means to transport the label to a position adjacent a box, and a presser mechanism to press the two label areas successively onto the box.

8. A box labeling machine comprising a label holder, pickers arranged to apply gum to a surface of a label in said holder, means to move said pickers to withdraw a label from its holder, means to remove the pickers successively from the label and mechanism to press onto the box that portion of the label surface which is first exposed and before removal of the other picker from contact with the label, and thereafter press the remainder of the label directly onto the box.

9. A box labeling machine comprising a box support, a label holder, pickers arranged to apply gum to substantially an entire surface of a label in said holder, means to move said pickers to pick the label from its holder, means to remove the pickers successively from the label and means to press the exposed portions of the label successively and directly onto the box after the removal of each picker.

10. A box labeling machine comprising a label holder, two pickers arranged to apply gum to two areas of a label in said holder, means including one of said pickers to transport the label from the holder to a position adjacent a box, means to remove the pickers successively from said label and expose gummed surfaces thereof, and means to affix said exposed surfaces successively to a box.

11. A box labeling machine comprising a label holder, two pickers, means to operate said pickers to apply gum to two areas of a label in said holder, transport the label to a position adjacent a box and successively withdraw the pickers from contact with the label, and mechanism to affix each area to a box after withdrawal of the picker engaging the same.

12. A box labeling machine comprising a label holder, two pickers, means to operate the same to apply gum to two areas of a label in said holder and transport the label to a position adjacent a box, means cooperating therewith to withdraw the pickers successively from the label, and presser mechanism to press each area directly onto a box after withdrawal of the picker engaging the same, one area being pressed while another contacts with a picker.

13. A box labeling machine comprising a label pack holder, two gummed pickers, mechanism to move the same to apply gum to two areas of a label in said pack, means to withdraw one picker from the label while the other engages the pack, said mechanism thereafter transporting the label to a position adjacent a box, and means to affix the exposed gummed label face to the box.

14. A box labeling machine comprising a label pack holder, two gummed pickers, mechanism to move the same to apply gum to two areas of a label in said pack, means to withdraw one picker from the label while the other engages the pack, said mechanism thereafter transporting the label to a position adjacent a box, and presser mechanism to press the exposed gummed face directly onto the box.

15. A box labeling machine comprising a label holder, two pickers, mechanism constructed and arranged to move said pickers and apply gum to two areas of a label in said holder, remove one picker from contact with the label and transport the latter to a position adjacent a box, means to remove the second picker from contact with the label, and means to affix the two areas of the label to the box.

16. A box labeling machine comprising two pickers, a label pack holder, means to transfer a coating of gum to said pickers, means to move said pickers to apply gum to two areas of a label in said pack and transport the label to a position adjacent a box, means to remove one of the pickers from the label while the other engages the pack, a presser mechanism to press the exposed gummed surface of the label onto the box and means to withdraw the other picker from contact with the label whereby the remainder of the label may be pressed onto the box.

17. A box labeling machine comprising a label pack holder, two pickers, means to transfer gum to said pickers, means to move said pickers into contact with substantially an entire surface of a label in said pack and transport the label to a position adjacent a box, means to remove one picker from contact with the label, a presser mechanism to press the exposed gummed label surface onto a box, and means to strip the other picker from the label, said presser mechanism thereafter operating to press the remainder of the label onto the box.

18. A box labeling machine comprising a support, two pickers pivotally and slidably mounted on said support, means to swing said pickers into contact with a label pack and thereafter present a gummed label surface to the box, means to slide one picker laterally and leave a portion of the label exposed and means to affix said exposed surface to the box.

19. In a box labeling machine, a picker mechanism comprising a support, a picker mounted thereon for pivotal and transverse movement, means associated therewith to swing the picker to gum and pick a label from a pack and transport it to a position near a box, means to press the exposed portion of the label on the box, and means to move the picker transversely and out of contact with the label so that the remainder thereof may be affixed to the box.

20. In a box labeling machine, a picker arranged to transport a gummed label to the box, means associated with the picker to apply an exposed gummed surface of the label to the box and means to move said picker so as to strip it gradually from the label while the remainder of the label is firmly held.

21. In a box labeling machine, means including a picker arranged to transport a gummed label to a position adjacent a box, means to affix an exposed gummed area on the box and means acting thereafter to move the picker into a position oblique to a line normal to the surface of the box and strip the picker gradually from the label while the label is held against the box.

22. In a box labeling machine, a mechanism including a picker mounted for a twisting movement to gum and transport a label to a position adjacent a box, means to press an exposed portion of the label on the box and means to twist said picker and thereby remove it gradually from contact with the label while the latter is held on the box.

23. In a box labeling machine, a picker mechanism comprising a support, a member pivotally mounted on said support, a picker suspended from said member and mounted for oscillation about its line of suspension, means effective to oscillate said member and swing the picker, means to turn said picker relative to its supporting member, and means to affix the label on the box, said parts being arranged to pick a label and transport it to a position adjacent a box and thereafter strip the picker gradually from the label.

24. In a box labeling machine, a picker mechanism comprising a support, a member rotatably and transversely movable thereon, a picker arm pivotally suspended from said member for oscillation about its axis of suspension, a picker on said arm and mechanism to move said member and arm to swing said picker, to move it transversely or to oscillate it about said line of suspension.

25. In a box labeling machine, a picker mechanism comprising a support, a member pivotally and slidably mounted on said support, a picker pivotally suspended from said member to revolve about its line of suspension, cam controlled mechanisms operable in predetermined timed relationship effective to swing said support and the picker carried thereby, to move the same laterally and to revolve the picker about its line of suspension.

26. A box labeling machine comprising a support for a label pack, two gummed pickers mounted for independent movement toward and from the pack, means to move said pickers into contact with a label in the pack and pick the same therefrom, and means operating in timed relation therewith to withdraw one picker from the label before the picking operation.

27. A box labeling machine comprising a support for a label pack, a picker support, two pickers mounted thereon for independent movement and mechanism effective to move the pickers simultaneously into contact with a label in said pack and thereafter move the pickers away from the pack one in advance of the other to pick the label from the pack and present an exposed face for application to a box.

28. A box labeling machine comprising a support for a label pack, two pickers having their combined gumming surfaces substantially as large as a label, means supporting said pickers for independent movement, means to move one picker into contact with a label in the pack and apply a gum coating thereto and thereafter withdraw the picker from the label and its subsequent path of movement, and means to move the other picker into contact with the label and hold it against the pack while the first named picker is being withdrawn and thereafter pick the label from the pack.

29. A box labeling machine comprising a support for a label pack, two gummed pickers mounted for movement toward and from the pack and laterally relative to each other, and mechanism to move said pickers simultaneously into contact with the pack, withdraw one picker laterally after it has transferred gum to a label while the other is held stationary thereagainst, and thereafter cause the other picker to pick the label from the pack.

30. A box labeling machine comprising a support, a label pack holder, members slidably and pivotally mounted on the support, two gummed pickers separately mounted on said members, cam operated mechanism to swing said pickers simultaneously into contact with the label pack and thereafter withdraw one picker laterally from contact with the label and cause the other to pick the label from the pack and transport it to a position adjacent a box.

31. A box labeling machine comprising a support for a label pack, a picker support, two gummed pickers independently mounted thereon for relative movement, mechanism effective to move said pickers simultaneously into contact with a label in said pack, and thereafter move the pickers away from the pack one in advance of the other, and means to press the exposed label face onto a box.

32. A box labeling machine comprising a rotatable horizontal shaft, a picker sleeve slidably keyed thereon, a vertical stud rotatably mounted on one side of said sleeve, a crank arm on said stud and a picker mounted on said crank arm, whereby said picker may be swung about a horizontal axis, moved transversely or revolved about a vertical axis.

33. A box labeling machine comprising a rotatable horizontal shaft, a picker sleeve slidably keyed thereon, a vertical stud rotatably mounted on one side of said sleeve, a crank arm on said stud, a picker mounted on said crank arm so arranged that said picker may be swung about a horizontal axis, moved transversely or revolved about a vertical axis, and cam operated mechanism effective to rotate said shaft, slide the picker sleeve and revolve the picker about the vertical axis in timed relationship.

34. A box labeling machine comprising a rotatable horizontal shaft, a picker sleeve slidably keyed on said shaft, a rod parallel with said shaft, a slide mounted on said rod and having a yoke connection with said sleeve, and means to move said slide and thereby move said picker sleeve transversely irrespective of the rotative position of the sleeve.

35. A box labeling machine comprising a rotatable shaft, a picker sleeve slidably keyed thereon, a picker suspended from said sleeve for pendulous movement, a second sleeve rotatably mounted on said shaft, an outer picker sleeve slidably keyed to said rotatable sleeve, a picker thereon, means to rock the shaft and swing the first mentioned picker and means to rock the rotatable sleeve and the picker mounted thereon.

36. A box labeling machine comprising a support for a label pack, a rotatable shaft, a picker sleeve slidably keyed thereon, a picker suspended from said sleeve for pendulous movement, a second sleeve rotatably mounted on said shaft, an outer picker sleeve slidably keyed to said rotatable sleeve, a picker thereon, means to rock the shaft and move the first mentioned picker, means to rock the rotatable sleeve and the picker thereon, and cam operated mechanisms working in timed relation to rock the shaft and said rotatable sleeve simultaneously to apply gum to a label in said pack, and therafter rock said rotatable sleeve in the reverse direction to withdraw the picker carried thereby from the gummed label.

37. A box labeling machine comprising a shaft, a rotatable sleeve slidable thereon, a vertical stud rotatably mounted on said sleeve, a picker suspended from said stud to revolve about the axis thereof and to swing about said shaft, a crank arm on said stud, a bar parallel with said shaft, a slide thereon adapted to engage the said crank arm and revolve the picker, and mechanism operating to move said sleeve and to swing said picker and move it transversely.

38. A box labeling machine comprising a picker mechanism arranged to gum substantially the entire surface of a label and present an exposed face thereof to a box, a presser finger having a plane surface as large as the exposed label face, and means to move the finger in a direction normal to the box surface and press the exposed label portion directly thereon.

39. A box labeling machine comprising a label pack support, a picker mechanism to gum the entire surface of a label and pick the same from the pack and to present an exposed gummed face thereof to a box, and a presser mechanism including a cushioned presser having a surface as large as the exposed label face effective to press the entire exposed label face directly onto the box.

40. A box labeling machine comprising a label pack holder, a picker mechanism to gum and pick a label from the pack and present an exposed gummed surface thereof to a box, a presser finger, means to move said finger normal to the box surface and press the label directly thereon, and means to remove the picker from the label during the pressing operation.

41. A box labeling machine comprising a picker mechanism including a movable picker arm having a gummed surface arranged to present an exposed face of a gummed label to a box, a presser finger, means to move the finger and press the exposed surface of the label directly onto the box, means to strip said picker from the label while the latter is held against the box, and cooperating means to press the remainder of the label directly onto the box.

42. A box labeling machine comprising a picker mechanism having a movable picker to present an exposed gummed face of a label to a box, a presser, operating mechanism to move said presser and press the exposed label face onto the box, and means to strip said picker from the label while the latter is held by the presser, said operating mechanism being effective to move the presser thereafter to press the remainder of the label onto the box.

43. A box labeling machine comprising a picker mechanism having a gummed picker arranged to present an exposed gummed surface of a label to a box, a movable presser finger, means to move the finger to press said exposed surface onto the box, means to strip said picker from the label, and means to move said finger laterally to a position over the remainder of the label for pressing the same onto the box.

44. A box labeling machine comprising a picker mechanism including a movable gummed picker for presenting an exposed gummed surface of a label to a box, a presser finger, means to move said finger toward and from the box, means to move the finger laterally and means to strip said picker from the label, said parts being constructed and arranged to press the initially exposed portion of the label onto the box, remove the picker while the label is held by the presser finger and then press said finger against the remainder of the label to affix it to the box.

45. A box labeling machine having a box support thereon, means including a picker to present two gummed portions of a label successively to a box on said support, a presser mechanism comprising a presser finger, means to produce relative movement between said finger and box toward and from each other and means operating in timed relation therewith to produce relative lateral movement between the box and finger whereby the latter may press the two exposed portions of the label successively onto the box.

46. A box labeling machine having a box support thereon, a presser mechanism comprising a movable presser finger, means to move said finger toward and from the box on said support, and means operating in timed relation therewith to move the finger laterally whereby it may press two portions of a label successively onto the box.

47. A box labeling machine having a movable presser finger, a slide carrying said finger, cam mechanism arranged to move the finger toward and from the box, a transversely movable member carrying said slide, and means to move said member and present the finger successively over different portions of the box whereby a label may be pressed thereon.

48. A box labeling machine having a movable presser finger, a slide arranged for moving said finger toward and from the box, a transversely movable member carrying said slide, cam operated mechanism to move said member and present the finger over two different portions of the box surface and cam operated mechanism actuating in timed relation therewith to move the finger toward the box in either of its two positions.

49. A box labeling machine comprising a label pack holder, a picker mechanism having a picker effective to pick a label from the pack and present an exposed gummed surface thereof to a box, and means to affix said exposed label surface to the box, said mechanism being thereafter effective to twist the picker and strip it from the label.

50. A box labeling machine comprising a label pack holder, a picker mechanism including a picker arranged to pick a label from the pack and present an exposed gummed surface thereof to a box, a presser, means to move the same to press the exposed label face onto the box and means to twist the picker and strip it from the label while the latter is held by the presser.

51. A box labeling machine comprising a picker mechanism including a movable picker arm having a gummed surface arranged to present an exposed face of a gummed label to a box, a presser finger, means to move the finger and press the exposed surface of the label directly onto the box, means to twist said picker and move it laterally, thereby gradually stripping said picker from the label while the latter is held against the box, and means to press the remainder of the label directly onto the box.

52. A box labeling machine comprising a label pack holder, two independently movable pickers, mechanism to move said pickers to gum a label in said pack and remove one picker therefrom while the other remains stationary against the pack and thereafter cause said stationary picker to pick the label from the pack and present an exposed gummed surface thereof to a box, a presser, mechanism to move the same to affix said exposed surface to the box and means operable thereafter to twist the picker and strip it from the label, whereby the remainder of the label may be affixed to the box.

53. A box labeling machine comprising two independently movable pickers having plane surfaces adapted to receive a coating of gum, a gum transfer roller, means to cause relative movement between the pickers and the gum transfer roller to coat the faces of the pickers with gum, and means for resiliently presenting the pickers to said roller with their surfaces in the same plane whereby they will receive an even coating of gum.

54. A box labeling machine comprising two independently oscillatory pickers having plane surfaces to be gummed, a gum transfer roller, means to move said roller across the paths of said pickers, and mechanism including resilient connecting members to move said pickers into contact with said roller for receiving an even coating of gum therefrom.

55. A box labeling machine comprising a support for a label pack, two independently movable pickers having surfaces for receiving gum, separate actuating mechanism for each picker to move it into contact with the label pack, a resilient connection between a picker and its actuating mechanism, a gum transfer roller and means to move said roller across the faces of said pickers as they move toward the pack.

56. A box labeling machine comprising a support for a label pack, oscillatory pickers adapted to move into contact with said pack, a gum transfer roller, mechanism to move said roller across said pickers as they move towards the pack and transfer a coating of gum thereto, a gum reservoir, a roller contacting with the gum therein and arranged to apply gum to the transfer roller, and adjusting means permitting the contacting surfaces of said rollers to be aligned.

57. In a box labeling machine, a reciprocable picker, a label pack support comprising a stationary standard, a holder slidably and pivotally mounted on said standard for adjustment relative to the picker, means on said holder to present an exposed label face in the path of the picker, and means to lift the holder away from contact with the picker.

58. In a box labeling machine, a label pack support comprising a standard and a holder resiliently mounted on said standard a picker arranged to swing normally into contact with a label in the pack, a cam device and an operating handle therefor to lift said holder out of the path of the picker said parts being arranged to adjustably position the label pack to present it properly to the picker.

59. A box labeling machine comprising a label pack holder, an oscillatory device to apply gum to a portion of a label in said pack and an oscillatory picker to apply gum to a further portion of said label and serve as the sole means to pick the label therefrom.

60. A box labeling machine comprising a label pack holder, means including a single oscillatory picker to apply gum to a portion of a label in said pack and pick the label therefrom, means to gum the remainder of the label surface and leave the same exposed and means to affix said exposed surface to a box.

61. A box labeling machine comprising a label pack holder, a gum transfer device arranged to apply gum to a portion of a label in said pack, means including a single picker to apply gum to the remainder of the label surface, pick the label from the pack and present an exposed gummed face to a box, and a presser finger to press said exposed face onto a box.

62. A box labeling machine comprising a label pack holder, a gumming member mounted to swing through an arc to gum a label in the pack, a gum reservoir, a gum transfer roller arranged to receive gum from the reservoir, a slide, an arm carrying said transfer roller pivotally mounted on said slide and said parts being so arranged that the transfer roller may sweep across the gumming member as the latter swings and means to cause said movements in timed relation to one another.

Signed at Worcester, Massachusetts, this 5th day of March 1923.

CARL HOLM.
ARVID H. JOHNSON.